Patented May 25, 1926.

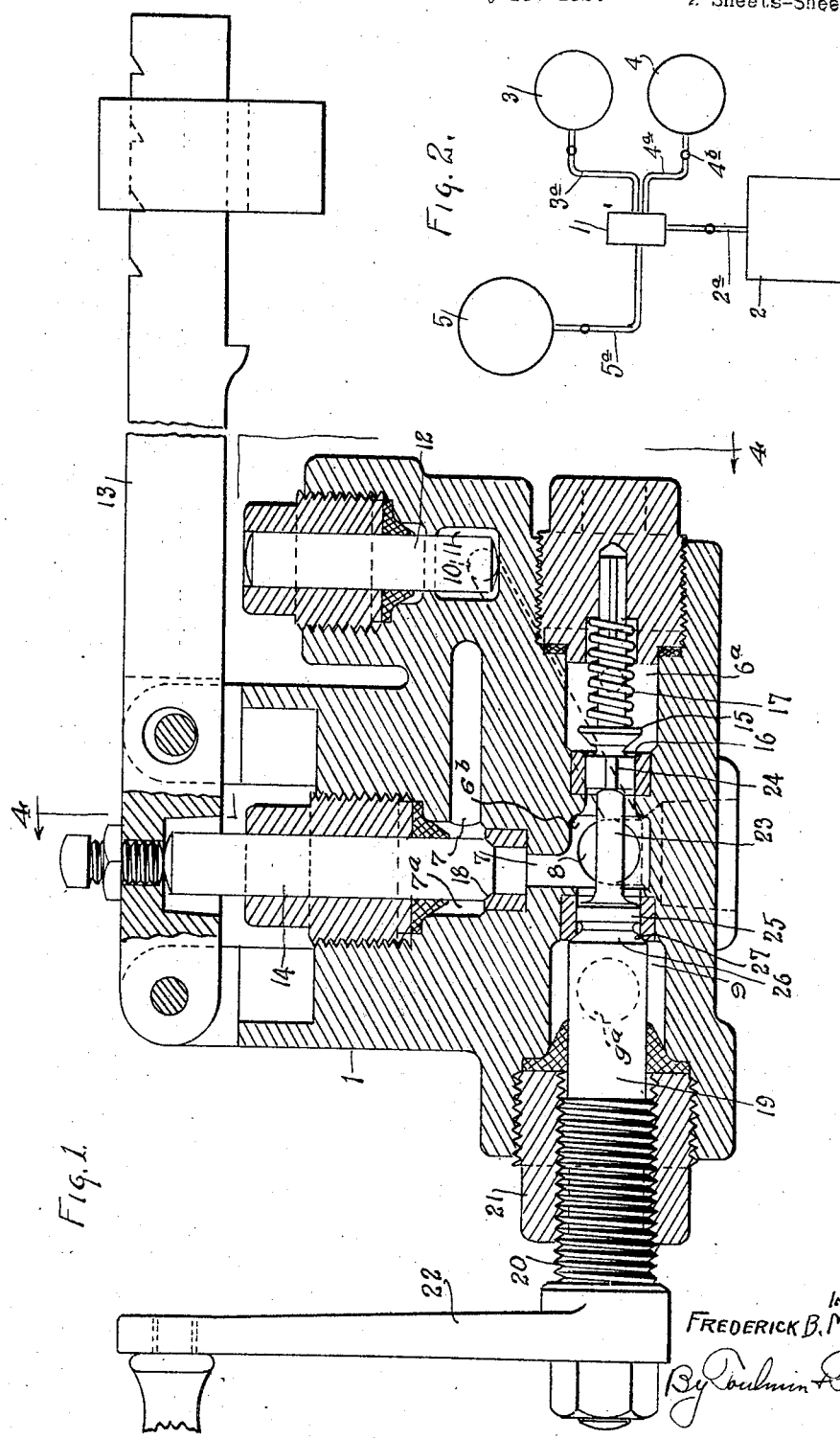

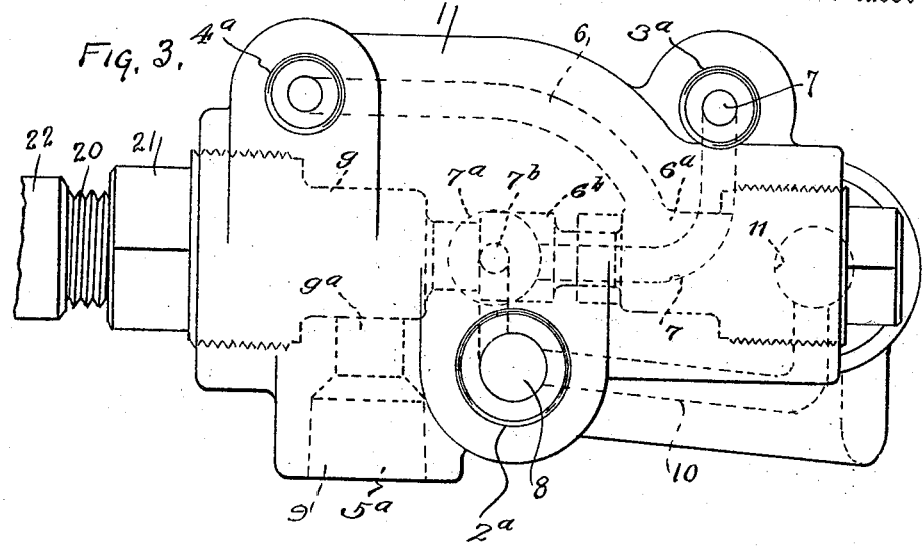

1,585,908

UNITED STATES PATENT OFFICE.

FREDERICK B. MOORMAN, OF DAYTON, OHIO, ASSIGNOR TO BUCKEYE IRON & BRASS WORKS, OF DAYTON, OHIO, A CORPORATION OF OHIO.

CHANGE VALVE.

Application filed July 16, 1924. Serial No. 726,385.

This invention relates to improvements in change valves for use in changing and controlling the flow of an actuating fluid to oil presses from accumulators which contain the actuating fluid under high and low pressure.

The particular object of my invention is to provide what I term a control valve designed to perform the two functions of permitting the closing of a valve in the low pressure line by an initial movement and by a further movement that of opening the exhaust port.

In the accompanying drawings which form a part of this specification:

Figure 1 is a vertical sectional view of such change valve complete with my improvements embodied therein;

Figure 2 is a diagrammatic view showing such change valve associated with an oil press, the two accumulators, and a pump tank;

Figure 3 is an inverted plan view of the change valve looking upward in Figure 1;

Figure 4 is an end elevation with the weight lever in section looking in the direction of the arrows in Figure 1.

By referring to the diagrammatic view of Figure 2 the manner of using these change valves will be readily understood. In this diagram the change valve is indicated generally by the numeral 1, the press at 2, the high pressure accumulator at 3, the low pressure accumulator at 4 and the exhaust fluid tank at 5. The change valve and press are connected by a pipe line $2^a$. The high pressure accumulator is connected with the change valve by a pipe line $3^a$; the low pressure accumulator by a pipe line $4^a$, and the exhaust fluid tank by a pipe line $5^a$.

In the high pressure accumulator the fluid, generally oil, and when I speak of oil hereafter I mean any suitable fluid for the purpose, is usually, in practice, four thousand (4000) pounds to the square inch. The pressure in the low pressure accumulator 4 is, in practice, usually five hundred (500) pounds to the square inch. In the beginning of the operation when the press is starting to create the pressure on the meats of the oil-containing seeds, the low pressure is sufficient, while after the compression of the meats has reached a later stage, the higher pressure is required to continue to actuate the press to cause it to complete the compression of the meats for the exudation of the oil therefrom.

With this preliminary explanation, I will proceed to describe the change valve generally and then to point out the peculiarities and functions of my control valve which forms a part thereof. The numeral 1 indicates a structure usually of cast brass. This structure contains several passageways for the pressure fluid. The low pressure fluid is first introduced through the pipe line $4^a$ leading from the accumulator 4 into a passageway 6, whence it passes into the chamber $6^a$ and then into the chamber $6^b$ from which it flows into a passageway 8 communicating with the pipe line $2^a$ which conveys the fluid to the press to be operated. The course of the high pressure fluid is through the pipe line $3^a$ into a passageway 7, thence into a chamber $7^a$, through a passageway $7^b$ into the chamber $6^b$ and then through the passageway 8 and pipe line $2^a$ to the press. A chamber 9 communicates with the chamber $6^b$ and when the pressure fluid is to be exhausted the valve between said chamber is open, whereupon the fluid passes from the chamber $6^b$ into the chamber 9, and then through a passageway $9^a$ to the pipe line $5^a$, returning to the exhaust tank 5. An auxiliary passage 10 leads from the passageway 8 to a chamber 11, the low pressure fluid thus conveyed acting on a plunger 12 whose function is that of aiding in lifting the weighted lever 13 by which the high pressure plunger valve 14 is kept closed for the purpose presently to appear.

The low pressure oil on its way to the passage or port 8, and thence to the press, is controlled by a low pressure valve 15, best seen in Figure 1, which is urged into its seat 16 by a spring 17 and is held open by my control valve as will presently appear. During the time when the low pressure oil is operating the press, this valve 15 stands open and is held open by my control valve. When the press offers resistance equal to or in excess of this low pressure, say five hundred pounds, the low pressure oil, being thus resisted, now acts to lift the high pressure valve 14 and the auxiliary plunger 12. The holding-down effect of the weighted lever 13 is thus overcome and the high pressure valve 14 lifted from its seat 18. This allows the high pressure oil in the passage 7, say under pressure of four thousand pounds to immediately pass thence into the port 8 and on to the press to actuate it to the point where the oil seeds are completely compressed. A check valve in the low pressure line 4ᵃ indicated at 4ᵇ prevents the high pressure oil from backing up into the low pressure accumulator 4.

Now comes into play my control valve indicated at 19. It has a threaded portion 20 which works in a threaded gland 21 and is actuated by a suitable handle 22 by the operator. A slight turn of the handle will move this control valve outward or to the left in Figure 1. This will gradually withdraw its finger 23 from the projecting end 24 of the valve 15 and allow the spring 17 to seat this valve. Then the further movement of the control valve will move its collar 25 and its shoulder 26 from the valve seat 27 and thus open a clear passageway from the port 8 to the exhaust port 9, causing the high pressure valve 14 immediately to seat, and the weight of the press plunger to drive the now cut-off operating oil back through the pipe line 2ᵃ and thence through the port 8 and exhaust passage 9 to the line 5ᵃ and into the pump tank 5.

And it will be observed that by reason of the control valve 19 permitting the low pressure valve 15 to close before the exhaust port is opened it prevents the escape from the low pressure line of any of its oil through the exhaust. If this were permitted, so much of the low pressure as thus escaped and went back to the pump tank would have to be re-pumped later. This re-pumping is avoided by reason of this first closing of the low pressure valve before the exhaust valve opens.

It will now be seen that my control valve indicated at 19 performs the two functions of first permitting the low pressure valve to close before the exhaust is opened, and then of opening the exhaust for the outflow of the oil then remaining in the press and change valve and the intermediate pipe line connection so that such oil can be exhausted therefrom into the pump tank, and that these functions are performed without permitting any of the oil in the low pressure line from passing into the exhaust port.

It will be understood that I do not desire to confine myself to the details of my invention, but comprehend within it suitable modifications necessary for its adaptations to varying condtions and use.

Having thus fully described my invention what I claim as new and desire to secure by Letters Patent is:

1. In a change valve structure, the combination with a low pressure valve and an exhaust port, of a control valve adapted to permit the closure of the low pressure valve and then to open communication with the exhaust port.

2. In a change valve structure, the combination with a low pressure valve and an exhaust port, of a control valve operable in said structure and having one portion which contacts with said low pressure valve and another portion which controls communication with said exhaust port, such portions being so positioned that the low pressure valve will close before the communication is established with the exhaust port, when the control valve is actuated.

3. In a change valve structure, the combination with a low pressure valve and an exhaust port, of a control valve having a projection adapted to engage the stem of said valve and a collar adapted to open and close communication with said exhaust port, and a threaded portion adapted for rotating such valve to adjust it longitudinally, for the purpose set forth.

4. In a change valve structure, the combination with a low pressure valve and an exhaust port, and a spring for closing said low pressure valve, of a control valve adapted to permit the closure of the low pressure valve by said spring and then to open communication with the exhaust port.

In testimony whereof, I affix my signature.

FREDERICK B. MOORMAN.